United States Patent
Zhang et al.

(10) Patent No.: US 8,483,148 B2
(45) Date of Patent: *Jul. 9, 2013

(54) TRANSPORT FORMAT COMBINATION SELECTION IN A WIRELESS TRANSMIT/RECEIVE UNIT

(75) Inventors: Guodong Zhang, Syosset, NY (US); Stephen E. Terry, Northport, NY (US); Stephen G. Dick, Nesconset, NY (US)

(73) Assignee: Intel Corporation, Santa Clara, CA (US)

( * ) Notice: Subject to any disclaimer, the term of this patent is extended or adjusted under 35 U.S.C. 154(b) by 583 days.

This patent is subject to a terminal disclaimer.

(21) Appl. No.: 12/422,516

(22) Filed: Apr. 13, 2009

(65) Prior Publication Data

US 2009/0196248 A1 Aug. 6, 2009

Related U.S. Application Data

(63) Continuation of application No. 11/705,638, filed on Feb. 12, 2007, now Pat. No. 7,522,557, which is a continuation of application No. 11/019,489, filed on Dec. 22, 2004, now Pat. No. 7,215,655.

(60) Provisional application No. 60/535,426, filed on Jan. 9, 2004.

(51) Int. Cl.
*H04W 4/00* (2009.01)

(52) U.S. Cl.
USPC .......................................... 370/329; 370/341

(58) Field of Classification Search
None
See application file for complete search history.

(56) References Cited

U.S. PATENT DOCUMENTS

| | | | |
|---|---|---|---|
| 6,993,342 B2 * | 1/2006 | Kuchibhotla et al. | 455/450 |
| 7,013,143 B2 * | 3/2006 | Love et al. | 455/450 |
| 7,215,655 B2 * | 5/2007 | Zhang et al. | 370/320 |
| 7,339,998 B2 | 3/2008 | Murata et al. | |
| 7,346,035 B2 | 3/2008 | Lee et al. | |
| 7,522,557 B2 * | 4/2009 | Zhang et al. | 370/329 |
| 2003/0092382 A1 | 5/2003 | Vayanos et al. | |
| 2003/0112786 A1 | 6/2003 | Terry et al. | |
| 2003/0185193 A1 | 10/2003 | Choi et al. | |

(Continued)

FOREIGN PATENT DOCUMENTS

EP 1 560 352 8/2005

OTHER PUBLICATIONS

Third Generation Partnership Project, "Technical Specification Group Radio Access Network; Feasibility Study for Enhanced Uplink for UTRA FDD (Release 6)," 3GPP TR 25.896 V6.0.0 (Apr. 2004).

(Continued)

*Primary Examiner* — Marsha D Banks Harold
*Assistant Examiner* — Hooman Houshmand
(74) *Attorney, Agent, or Firm* — Blakely, Sokoloff, Taylor & Zafman LLP

(57) ABSTRACT

A method and apparatus for selecting a TFC in a wireless transmit/receive unit (WTRU) is disclosed. The WTRU estimates a transmit power for each of a plurality of available transport format combinations (TFCs). A TFC is selected for an uplink dedicated channel and a TFC is selected for an enhanced uplink (EU) channel. The TFC for the dedicated channel is selected first and independently of the TFC selection of the EU channel. The TFC for the EU channel is selected within a remaining WTRU transmit power after the TFC selection for the dedicated channel.

12 Claims, 3 Drawing Sheets

U.S. PATENT DOCUMENTS

| | | | |
|---|---|---|---|
| 2004/0102205 A1 | 5/2004 | Zhang et al. | |
| 2004/0228313 A1* | 11/2004 | Cheng et al. | 370/342 |
| 2005/0041694 A1* | 2/2005 | Liu | 370/524 |
| 2005/0043052 A1 | 2/2005 | Whinnett et al. | |
| 2005/0047393 A1 | 3/2005 | Liu | |
| 2005/0053035 A1* | 3/2005 | Kwak et al. | 370/331 |
| 2005/0053088 A1 | 3/2005 | Cheng et al. | |
| 2005/0068921 A1* | 3/2005 | Liu | 370/335 |
| 2005/0068990 A1 | 3/2005 | Liu | |
| 2005/0073985 A1* | 4/2005 | Heo et al. | 370/342 |
| 2005/0117559 A1* | 6/2005 | Malladi et al. | 370/342 |
| 2005/0152310 A1 | 7/2005 | Rudolf et al. | |
| 2005/0249154 A1* | 11/2005 | Kim et al. | 370/328 |
| 2006/0023687 A1* | 2/2006 | Cheng et al. | 370/342 |
| 2006/0085729 A1 | 4/2006 | Takeshi | |

OTHER PUBLICATIONS

3GPP TS25.309, 3$^{rd}$ Generation Partnership Project; Technical Specification Group Radio Access Network; "FDD Enhanced Uplink", version 0.2.0, Stage 2, Release 6, Jun. 2004.

3GPP2 C.20003-C, "Medium Access Control (MAC) Standard for cdma2000 Spread Spectrum Systems", 3$^{rd}$ Generation Partnership Project 2 "3GPP2", Version 2.0, Releae C, Aug. 2004.

Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).

Third Generation Partnership Project, "Technical Specification Group Radio Access Network; Physical channels and mapping of transport channels onto physical channels (FDD) (Release 4)," 3GPP TS 25.211 V4.6.0 (Sep. 2002).

Third Generation Partnership Project, "Technical Specification Group Radio Access Network; Physical channels and mapping of transport channels onto physical channels (FDD) (Release 5)," 3GPP TS 25.211 V5.5.0 (Sep. 2003).

Third Generation Partnership Project, "Technical Specification Group Radio Access Network; Physical channels and mapping of transport channels onto physical channels (FDD) (Release 5)," 3GPP TS 25.211 V5.6.0 (Sep. 2004).

Third Generation Partnership Project, "Technical Technical Specification Group Radio Access Network; Physical channels and mapping of transport channels onto physical channels (FDD) (Release 6)," 3GPP TS 25.211 V6.2.0 (Sep. 2004).

Third Generation Partnership Project, "Technical Technical Specification Group Radio Access Network; Physical layer procedures (FDD) (Release 1999)," 3GPP TS 25.214 V3.12.0 (Mar. 2003).

Third Generation Partnership Project, "Technical Technical Specification Group Radio Access Network; Physical layer procedures (FDD) (Release 4)," 3GPP TS 25.214 V4.6.0 (Mar. 2003).

Third Generation Partnership Project, "Technical Technical Specification Group Radio Access Network; Physical layer procedures (FDD) (Release 5)," 3GPP TS 25.214 V5.6.0 (Sep. 2003).

Third Generation Partnership Project, "Technical Technical Specification Group Radio Access Network; Physical layer procedures (FDD) (Release 5)," 3GPP TS 25.214 V5.9.0 (Jun. 2004).

Third Generation Partnership Project, "Technical Technical Specification Group Radio Access Network; Physical layer procedures (FDD) (Release 6)," 3GPP TS 25.214 V6.3.0 (Sep. 2004).

3GPP TS25.308, 3rd Generation Partnership Project; Technical Specification Group Radio Access Network; "High Speed Downlink Packet Access (HSDPA)", Version 5.4.0, Stage 2, Release 5, Mar. 2003.

3GPP TS25.308, 3$^{rd}$ Generation Partnership Project; Technical Specification Group Radio Access Network; "High Speed Downlink Packet Access (HSDPA)", Version 5.5.0, Stage 2, Release 5, Mar. 2004.

3GPP TS25.309, 3rd Generation Partnership Project; Technical Specification Group Radio Access Network; "FDD Enhanced Uplink", Version 6.0.0, Stage 2, Release 6, Sep. 2004.

3GPP TS25.309, 3$^{rd}$ Generation Partnership Project; Technical Specification Group Radio Access Network; "FDD Enhanced Uplink"; Version 0.2.0, Stage 2, Release 6, Jun. 2004.

3GPP TSG-RAN WG2, Meeting #38, "E-DCH L2/L3 issues", Oct. 6-10, 2003, Sophia Antipolis, France, pp. 1-2.

3GPP TSG-RAN WG2, Meeting #40, "E-DCH L2/L3 protocol issues", Jan. 12-16, 2004, Sophia Antipolis, France, pp. 1-2.

3GPP, "3$^{rd}$ Generation Partnership Project; Technical Specification Group Radio Access Network; Medium Access Control (MAC) Protocol Specification (Release 1999)," 3GPP TS 25.321 V3.16.0 (Sep. 2003).

3GPP, "3$^{rd}$ Generation Partnership Project; Technical Specification Group Radio Access Network; Medium Access Control (MAC) Protocol Specification (Release 1999)," 3GPP TS 25.321 V3.17.0 (Jun. 2004).

3GPP, "3$^{rd}$ Generation Partnership Project; Technical Specification Group Radio Access Network; Medium Access Control (MAC) Protocol Specification (Release 4)," 3GPP TS 25.321 V4.9.0 (Sep. 2003).

3GPP, "3$^{rd}$ Generation Partnership Project; Technical Specification Group Radio Access Network; Medium Access Control (MAC) Protocol Specification (Release 4)," 3GPP TS 25.321 V4.10.0 (Jun. 2004).

3GPP, "3$^{rd}$ Generation Partnership Project; Technical Specification Group Radio Access Network; Medium Access Control (MAC) Protocol Specification (Release 5)," 3GPP TS 25.321 V5.6.0 (Sep. 2003).

3GPP, "3$^{rd}$ Generation Partnership Project; Technical Specification Group Radio Access Network; Medium Access Control (MAC) Protocol Specification (Release 5)," 3GPP TS 25.321 V5.9.0 (Jun. 2004).

3GPP, "3$^{rd}$ Generation Partnership Project; Technical Specification Group Radio Access Network; Medium Access Control (MAC) Protocol Specification (Release 6)," 3GPP TS 25.321 V6.2.0 (Jun. 2004).

3GPP2 C.20003-C, "Medium Access Control (MAC) Standard for cdma2000 Spread Spectrum Systems", 3$^{rd}$ Generation Partnership Project 2 "3GPP2", Version 2.0, Release C, Aug. 2004.

3GPP2 C.S0002-C, "Physical Layer Standard for cdma2000 Spread Spectrum Systems", 3$^{rd}$ Generation Partnership Project 2 "3GPP2", Version 2.0, Revision C, Jul. 23, 2004.

3GPP2 C.S0004-C, "Signaling Link Access Control (LAC) Standard for cdma2000 Spread Spectrum Systems", 3$^{rd}$ Generation Partnership Project 2 "3GPP2", Version 2.0, Revision C, Jul. 23, 2004.

3GPP2 C.S0005-C, "Upper Layer (Layer 3) Signaling Standard for cdma2000 Spread Spectrum Systems", 3$^{rd}$ Generation Partnership Project 2 "3GPP2", Version 2.0, Revision c, Jul. 23, 2004.

Ericsson, "On the use of a short TTI for enhanced uplink DCH," TSG-RAN WG1 #31, R1-030211 (Feb. 18-21, 2003).

Nokia, "E-DCH L2/L3 issues, TFC selection and priority handling," 3GPP TSG-RAN WG2 #39, R2-032451 (Nov. 17-21, 2003).

Panasonic, "Alternative signalling method to control Node B controlled TFC," 3GPP TSG-RAN WG1 Meeting #35, R1-031333 (Oct. 6-10, 2003).

Qualcomm Europe, "Full buffer E-DCH Cell Throughput with 2ms TTI and long scheduling period," 3GPP TSG RAN WG1 #35, R1-03-1247 (Nov. 17-21, 2003).

Third Generation Partnership Project, "Technical Specification Group Radio Access Network; Requirements For Support Of Radio Resource Management (FDD) (Release 1999)", 3GPP TS 25.133, V3.15.0, (Sep. 2003).

Third Generation Partnership Project, "Technical Specification Group Radio Access Network; Requirements For Support Of Radio Resource Management (FDD) (Release 1999)", 3GPP TS 25.133, V3.22.0, (Sep. 2005).

Third Generation Partnership Project, "Technical Specification Group Radio Access Network; Requirements For Support Of Radio Resource Management (FDD) (Release 4)", 3GPP TS 25.133, V4.7.0, (Dec. 2002).

Third Generation Partnership Project, "Technical Specification Group Radio Access Network; Requirements For Support Of Radio Resource Management (FDD) (Release 4)", 3GPP TS 25.133, V4.17.0, (Mar. 2006).

Third Generation Partnership Project, "Technical Specification Group Radio Access Network; Requirements For Support Of Radio Resource Management (FDD) (Release 5)", 3GPP TS 25.133, V5.8.0, (Sep. 2003).

Third Generation Partnership Project, "Technical Specification Group Radio Access Network; Requirements For Support Of Radio Resource Management (FDD) (Release 5)", 3GPP TS 25.133, V5.18.0, (Sep. 2007).
Third Generation Partnership Project, "Technical Specification Group Radio Access Network; Requirements For Support Of Radio Resource Management (FDD) (Release 6)", 3GPP TS 25.133, V6.3.0, (Sep. 2003).
Third Generation Partnership Project, "Technical Specification Group Radio Access Network; Requirements For Support Of Radio Resource Management (FDD) (Release 6)", 3GPP TS 25.133, V6.24.0, (Mar. 2009).
Third Generation Partnership Project, "Technical Specification Group Radio Access Network; Requirements For Support Of Radio Resource Management (FDD) (Release 7)", 3GPP TS 25.133, V7.14.0, (Mar. 2009).
Third Generation Partnership Project, "Technical Specification Group Radio Access Network; Requirements For Support Of Radio Resource Management (FDD) (Release 8)", 3GPP TS 25.133, V8.6.0, (Mar. 2009).
Third Generation Partnership Project, "Technical Specification Group Radio Access Network; Physical channels and mapping transport channels onto physical channels (FDD) (Release 1999)," 3GGP TS 25.211 V3.12.0 (Sep. 2002).
Third Generation Partnership Project, "Technical Specification Group Radio Access Network; Physical channels and mapping transport channels onto physical channels (FDD) (Release 4)," 3GGP TS 25.211 V4.6.0 (Sep. 2002).
Third Generation Partnership Project, "Technical Specification Group Radio Access Network; Physical channels and mapping transport channels onto physical channels (FDD) (Release 5)," 3GGP TS 25.211 V5.5.0 (Sep. 2003).
Third Generation Partnership Project, "Technical Specification Group Radio Access Network; Physical channels and mapping transport channels onto physical channels (FDD) (Release 5)," 3GGP TS 25.211 V5.6.0 (Sep. 2004).
Third Generation Partnership Project, "Technical Specification Group Radio Access Network; Requirements for support of radio resource management (FDD) (Release 6)," 3GPP TS 25.133 V6.7.0 (Sep. 2004).
Third Generation Partnership Project, "Technical Specification Group Radio Access Network; Requirements for support of radio resource management (FDD) (Release 5)," 3GPP TS 25.133 V5.12.0 (Sep. 2004).
Third Generation Partnership Project, "Technical Specification Group Radio Access Network; Requirements for support of radio resource management (FDD) (Release 1999)," 3GPP TS 25.133 V3.19.0 (Sep. 2004).
Third Generation Partnership Project, "Technical Specification Group Radio Access Network; Requirements for support of radio resource management (FDD) (Release 4)," 3GPP TS 25.133 V4.10.0 (Sep. 2003).
Third Generation Partnership Project, "Technical Specification Group Radio Access Network; Requirements for support of radio resource management (FDD) (Release 4)," 3GPP TS 25.133 V4.13.0 (Sep. 2004).
Third Generation Partnership Project, "Technical Specification Group Radio Access Network; Physical channels and mapping of transport channels onto physical channels (FDD) (Release 6)," 3GPP TS 25.211 V6.2.0 (Sep. 2004).
Third Generation Partnership Project, "Technical Specification Group Radio Access Network; Physical layer procedures (FDD) (Release 1999),"3GPP TS 25.214 V.3.12.0 (Mar. 2003).
Third Generation Partnership Project, "Technical Specification Group Radio Access Network; Physical layer procedures (FDD) (Release 4)," 3GPP TS 25.214 V4.6.0 (Mar. 2003).
Third Generation Partnership Project, "Technical Specification Group Radio Access Network; Physical layer procedures (FDD) (Release 5)," 3GPP TS 25.214 V5.6.0 (Sep. 2003).
Third Generation Partnership Project, "Technical Specification Group Radio Access Network; Physical layer procedures (FDD) (Release 5)," 3GPP TS 25.214 V5.9.0 (Jun. 2004).
Third Generation Partnership Project, "Technical Specification Group Radio Access Network; Physical layer procedures (FDD) (Release 6)," 3GPP TS 25.214 V6.3.0 (Sep. 2004).
Third Generation Partnership Project, "Technical Specification Group Radio Access Network; Feasability Study for Enhanced Uplink for UTRA FDD (Release 6)," 3GPP TR 25.896 V6.0.0 (Apr. 2004).
Third Generation Partnership Project, "Technical Specification Group Radio Access Network; Feasibility Study for Enhanced Uplink for UTRA FDD (Release 6)," 3GPP TR 25.896 V1.1.2 (Dec. 2003).
Third Generation Partnership Project, Technical Specification Group Radio Access Network; Radio Resource Control (RRC) protocol specification (Release 1999), 3GPP TS 25.331 V3.16.0 (Sep. 2003).
Third Generation Partnership Project, Technical Specification Group Radio Access Network; Radio Resource Control (RRC) protocol specification (Release 1999), 3GPP TS 25.331 V3.20.0 (Sep. 2004).
Third Generation Partnership Project, Technical Specification Group Radio Access Network;Radio Resource Contol (RRC); Protocol Specification (Release 4), 3GPP TS 25.331 V4.11.0 (Sep. 2003).
Third Generation Partnership Project, Technical Specification Group Radio Access Network; Radio Resource Control (RRC); Protocol Specification (Release 4), 3GPP TS 25.331 V4.15.0 (Jun. 2004).
Third Generation Partnership Project, Technical Specification Group Radio Access Network; Radio Resource Control (RRC); Protocol Specification (Release 5), 3GPP TS 25.331 V5.6.0 (Sep. 2003).
Third Generation Partnership Project, Technical Specification Group Radio Access Network; Radio Resource Control (RRC); Protocol Specification (Release 5), 3GPP TS 25.331 V5.10.0 (Sep. 2004).
Third Generation Partnership Project, Technical Specification Group Radio Access Network; Radio Resource Control (RRC); Protocol Specification (Release 6), 3GPP TS 25.331 V6.3.0 (Sep. 2004).
Third Generation Partnership Project, "Technical Specification Group Radio Access Network; Spreading and modulation (FDD) (Release 1999)," 3GPP TS 25.213 V3.9.0 (Dec. 2003).
Third Generation Partnership Project, "Technical Specification Group Radio Access Network; Spreading and modulation (FDD) (Release 4)," 3GPP TS 25.213 V4.4.0 (Dec. 2003).
Third Generation Partnership Project, "Technical Specification Group Radio Access Network; Spreading and modulation (FDD) (Release 5)," 3GPP TS 25.213 V5.5.0 (Dec. 2003).
Third Generation Partnership Project, "Technical Specification Group Radio Access Network; Spreading and modulation (FDD) (Release 6)," 3GPP TS 25.213 V6.0.0 (Dec. 2003).
Third Generation Partnership Project, "Technical Specification Group Radio Access Network; Spreading and modulation (FDD) (Release 1999)," 3GPP TS 25.213 V3.8.0 (Jun. 2002).
Third Generation Partnership Project, "Technical Specification Group Radio Access Network; Spreading and modulation (FDD) (Release 4)," 3G TS 25.213 V4.3.0 (Jun. 2002).
Third Generation Partnership Project, "Technical Specification Group Radio Access Network; Spreading and modulation (FDD) (Release 5)," 3GPP TS 25.213 V5.4.0 (Mar. 2003).
3GPP TS25.308, $3^{rd}$ Generation Partnership Project; Technical Specification Group Radio Access Network; "High Speed Downlink Packet Access (HSDPA)", Version 5.6.0, Stage 2, Release 5, Sep. 2004.
3GPP TS25.308, $3^{rd}$ Generation Partnership Project; Technical Specification Group Radio Access Network; "High Speed Downlink Packet Access (HSDPA)", Version 6.2.0, Stage 2, Release 6, Sep. 2004.

* cited by examiner

TRANSPORT FORMAT COMBINATION SELECTION IN A WIRELESS TRANSMIT/RECEIVE UNIT

CROSS REFERENCE TO RELATED APPLICATION

This application is a continuation of U.S. patent application Ser. No. 11/705,638 filed Feb. 12, 2007, which is a continuation of U.S. patent application Ser. No. 11/019,489 filed Dec. 22, 2004, which issued on May 8, 2007 as U.S. Pat. No. 7,215,655, which claims priority from U.S. Provisional Application No. 60/535,426 filed Jan. 9, 2004 which are incorporated by reference as if fully set forth.

FIELD OF INVENTION

The present invention is related to a wireless communication system.

BACKGROUND

Under the current Third Generation Partnership Project (3GPP) standards, a WTRU is required to estimate a transmission power for each TFC. In the case that a certain TFC would require more transmission power than the maximum allowed WTRU transmission power, the WTRU should limit the usage of that TFC.

The WTRU continuously evaluates which TFCs can be used for transmission. The evaluation is performed using the estimated WTRU transmit power of a given TFC. When any TFC is restricted for exceeding a transmit power limit, the medium access control (MAC) entity in the WTRU notifies an upper layer to reduce the data rate, if applicable.

Under the current 3GPP standards, a WTRU has only one coded composite transport channel (CCTrCH) in uplink transmission. Therefore, the WTRU transmit power is the transmit power of the CCTrCH, which is determined by the TFC used for the CCTrCH.

In order to improve uplink coverage, throughput and transmission latency for uplink transmissions, enhanced uplink (EU) is currently being investigated in 3GPP. With EU implementation, a WTRU may have more than one CCTrCH in uplink transmissions; one for the regular dedicated channel (DCH) and the other for EU enhanced dedicated channel (E-DCH). In this case, the WTRU transmit power will be the sum of the transmit power of two CCTrCHs.

The WTRU transmit power is determined jointly by the TFCs of the two CCTrCHs. The combination of the TFC used by the dedicated CCTrCH and the TFC used by the EU CCTrCH is defined as the TFC pair of the WTRU whose transmit power is determined jointly by the TFCs of the two CCTrCHs. This is not an optimal method of determining the TFCs for more than one CCTrCH.

There is a need for an efficient method for selecting a combination of TFCs for more than one CCTrCHs in uplink transmission.

SUMMARY

A method and apparatus for selecting a TFC in a wireless transmit/receive unit (WTRU) is disclosed. The WTRU estimates a transmit power for each of a plurality of available transport format combinations (TFCs). A TFC is selected for an uplink dedicated channel and a TFC is selected for an enhanced uplink (EU) channel. The TFC for the dedicated channel is selected first and independently of the TFC selection of the EU channel. The TFC for the EU channel is selected within a remaining WTRU transmit power after the TFC selection for the dedicated channel.

DETAILED DESCRIPTION OF THE PREFERRED EMBODIMENTS

Hereafter, the terminology "WTRU" includes but is not limited to a user equipment, a mobile station, a fixed or mobile subscriber unit, a pager, or any other type of device capable of operating in a wireless environment.

The features of the present invention may be incorporated into an integrated circuit (IC) or be configured in a circuit comprising a multitude of interconnecting components.

Hereinafter, the present invention will be described with reference to a system supporting two CCTrCHs, (i.e., a dedicated CCTrCH and an EU CCTrCH). However, it should be noted that the present invention is applicable to a system supporting more than two CCTrCHs.

Figure 1:
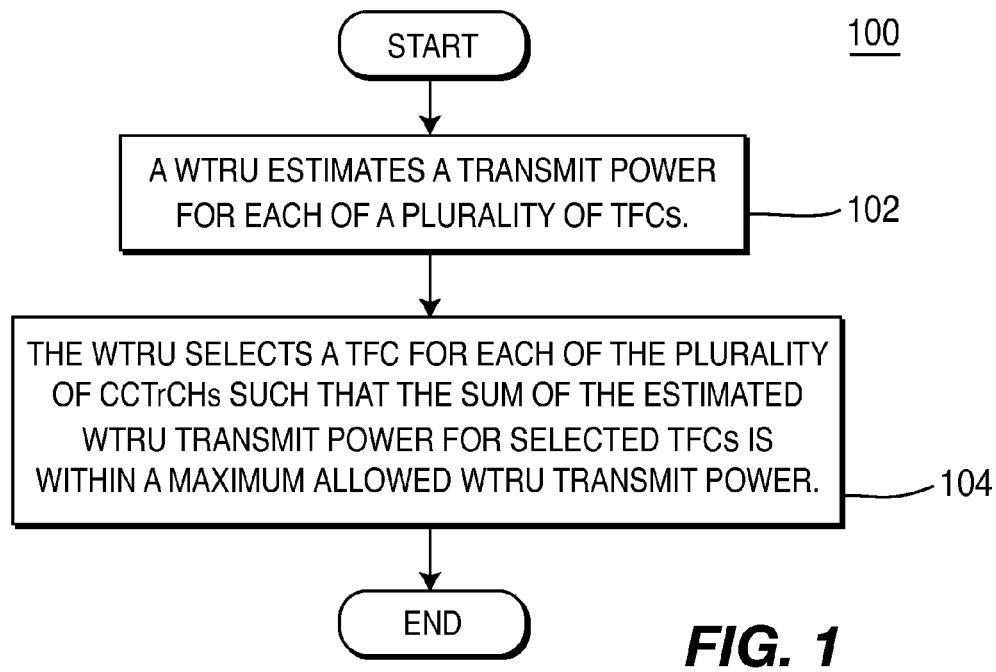
FIG. 1 is a flow diagram of a general process for selecting TFCs in accordance with a first embodiment of the present invention.

FIG. 1 is a flow diagram of a process 100 for selecting TFCs in accordance with a first embodiment of the present invention. The WTRU is configured to process a dedicated CCTrCH and an EU CCTrCH simultaneously in uplink transmission. The transmit power of the WTRU is limited to a maximum allowed WTRU transmit power, which is set by the wireless communication system. In each transmit time interval (TTI), the WTRU estimates the transmit power for each of a plurality of available TFCs (step 102) for each CCTrCH. The WTRU estimates the transmit power of each TFC over a predetermined period taking into account the gain factor of each corresponding TFC. The WTRU then selects TFCs for transmission on each CCTrCH among a plurality of available TFCs, such that the sum of the estimated transmit power of the selected TFCs for the dedicated CCTrCH and the EU CCTrCH does not exceed the maximum allowed WTRU transmit power (step 104).

Additionally, the dedicated CCTrCH, the EU CCTrCH, or both may be provided with a capability of transmitting a reserved minimum set of TFCs even when the power required for transmission of these TFCs exceeds the maximum allowed WTRU transmit power. TFCs that require power greater then the maximum allowed transmit power are defined to be in an excess power state. The minimum set is for reserving a lowest rate in a CCTrCH, thereby maintaining the basic services for the channel. Since in the EU CCTrCH there is only one TrCH, the minimum set corresponds to a lowest rate per logical channel or MAC-d flow mapped to the EU TrCH. The minimum set of TFCs may be one transport block per TTI for each channel mapped to the CCTrCH or a number of transport blocks per TTI corresponding to a guaranteed bit rate (GBR).

The reserved minimum set of TFCs may be transmitted in an excess power state. In order to maintain the transmit power within the allowed maximum level, a WTRU scales down power on physical channels mapped to the dedicated CCTrCH, the EU CCTrCH, or all physical channels present.

Regardless of the TFC selection, the EU CCTrCH may be provided with a minimum reserved set of TFCs that is one or more transport blocks per logical channel or MAC-d flow mapped to the EU CCTrCH. A transport block is one or more radio link control (RLC) protocol data units (PDUs). One or more transport blocks is equivalent to a data rate. The reserved set of TFCs can be transmitted in an excess power state by scaling down power on either the physical channels mapped to the EU CCTrCH, the dedicated CCTrCH or all present UL channels.

Figure 2:
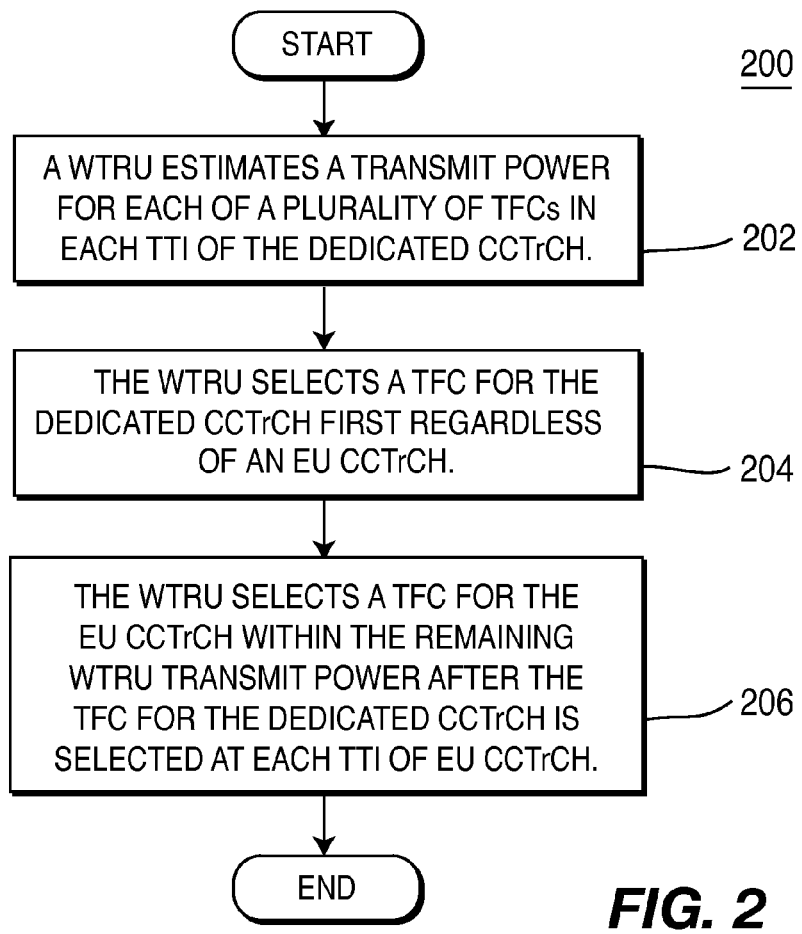
FIG. 2 is a flow diagram of a process for selecting TFCs in accordance with a second embodiment of the present invention.

FIG. 2 is a flow diagram of a process 200 for selecting TFCs in accordance with a second embodiment of the present invention. TFC selection of the dedicated CCTrCH is prioritized over TFC selection of the EU CCTrCH. In each TTI of the dedicated CCTrCH, the WTRU estimates the transmit power requirement for each of a plurality of available TFCs configured for the dedicated CCTrCH (step 202). The WTRU selects a TFC for the dedicated CCTrCH first, without considering the power requirement of the EU CCTrCH (step 204). After the TFC for the dedicated CCTrCH is selected, at each TTI of the EU CCTrCH the WTRU selects a TFC for the EU CCTrCH within the remaining WTRU transmit power after the power required for the selected TFC for the dedicated CCTrCH is deducted from the maximum allowed WTRU transmit power (step 206). The TFC selection of the dedicated CCTrCH is not affected by the operation of EU CCTrCH, while the TFC selection of the EU CCTrCH is affected and limited by the operation of the dedicated CCTrCH.

The remaining power for the EU CCTrCH is estimated either each dedicated CCTrCH TTI or each EU CCTrCH TTI. At each TTI of the EU CCTrCH, the remaining power available for the EU CCTrCH is estimated as the maximum allowed WTRU transmit power minus the power required by transmission of the selected dedicated CCTrCH TFC. Alternatively, at each TTI of the dedicated CCTrCH, the remaining power available for the EU CCTrCH is estimated as the maximum allowed WTRU transmit power minus the power required to support transmission of the selected dedicated CCTrCH TFC.

In process 200, the EU CCTrCH may allow transmission of a minimum set of TFCs even when these TFCs are in excess power state. An EU TFC is in excess power state when the estimated remaining power is less then the calculated transmission power requirement for the EU CCTrCH TFC. The EU minimum set reserves a lowest or guaranteed rate on channels mapped to the EU CCTrCH, and thereby maintains the basic services for EU channels. Since in the EU CCTrCH there is only one TrCH, the minimum set corresponds to a lowest rate per logical channel or MAC-d flow mapped to the EU TrCH. The minimum set of TFCs may be one transport block per TTI for each channel mapped to the CCTrCH or a number of transport blocks per TTI corresponding to a guaranteed bit rate (GBR). When transmitting a TFC in excess power state, in order to maintain the transmit power within the allowed maximum level, the WTRU scales down power on physical channels mapped to the EU CCTrCH, the dedicated CCTrCH, or all physical channels present.

Figure 3:
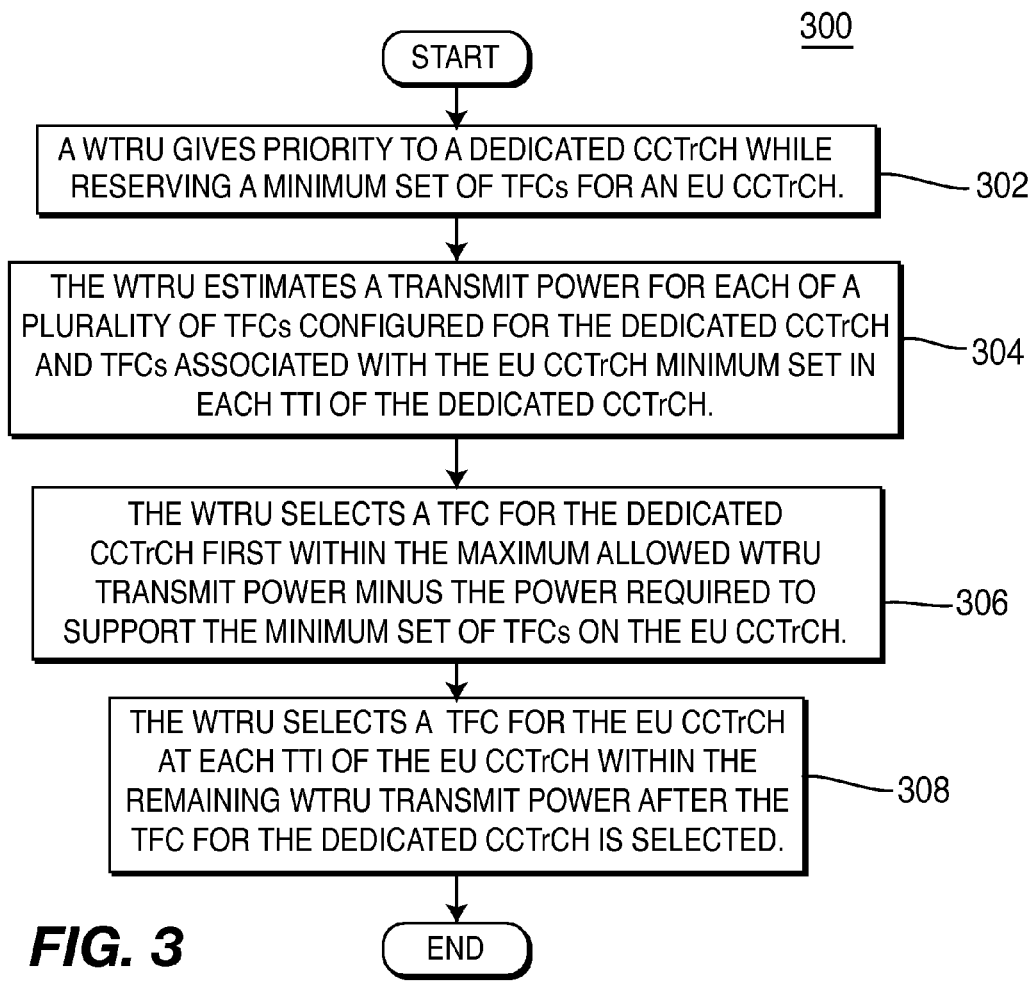
FIG. 3 is a flow diagram of a process for selecting TFCs in accordance with a third embodiment of the present invention.

FIG. 3 is a flow diagram of a process 300 for selecting TFCs in accordance with a fourth embodiment of the present invention. The WTRU gives priority to dedicated CCTrCH TFC selection while reserving transmit power for a minimum set of EU CCTrCH TFCs (step 302). A minimum set of TFCs for an EU CCTrCH is defined to reserve a lowest or guaranteed rate for channels mapped to the EU CCTrCH. Since in the EU CCTrCH there is only one TrCH, the minimum set corresponds to a lowest rate per logical channel or MAC-d flow mapped to the EU TrCH. The minimum set of TFCs may be one transport block per TTI for each channel mapped to the CCTrCH, or a number of transport blocks per TTI corresponding to a GBR.

The EU CCTrCH may allow transmission of a minimum set of TFCs even when these TFCs are in excess power state. An EU TFC is in excess power state when the estimated remaining power is less then the calculated transmission power requirement for the EU TFC. When transmitting a TFC in excess power state, in order to maintain the transmit power within the allowed maximum level, the WTRU scales down power on physical channels mapped to the EU CCTrCH, the dedicated CCTrCH, or all physical channels present.

When a TFC is in an excess power state (with reduced power), the quality of the transmission is reduced, (i.e., lower SIR, higher BLER, etc). This may defeat the purpose of maintaining the minimum set. Therefore, in order to minimize the possibility that the EU CCTrCH TFC has to be transmitted in an excess power state, and to further insure the minimum set is really supported, in process 300 transmit power is reserved for the EU minimum set when TFC selection is performed on the prioritized dedicated CCTrCH.

TFC selection of the dedicated CCTrCH is prioritized over TFC selection of the EU CCTrCH. In each TTI of the dedicated CCTrCH, the WTRU estimates the transmit power for each of a plurality of available TFCs configured for the dedicated CCTrCH and TFCs associated with the EU CCTrCH minimum set (step 304). The WTRU selects a TFC for the dedicated CCTrCH that has a power requirement that does not exceed the maximum allowed transmit power minus the power required to support the minimum set of TFCs on the EU CCTrCH (step 306). After the TFC for the dedicated CCTrCH is selected, at each TTI of the EU CCTrCH the WTRU selects a TFC for the EU CCTrCH with the remaining transmit power after power required for the selected the TFC for the dedicated CCTrCH is deducted from the maximum allowed transmit power (step 308).

The remaining power for the EU CCTrCH is estimated either each dedicated CCTrCH TTI or each EU CCTrCH TTI. At each TTI of the EU CCTrCH, the remaining power available for the EU CCTrCH is estimated as the maximum allowed WTRU transmit power minus the power required by transmission of the selected dedicated CCTrCH TFC. Alternatively, at each TTI of the dedicated CCTrCH, the remaining power available for the EU CCTrCH is estimated as the maximum allowed WTRU transmit power minus the power required to support transmission of the selected dedicated CCTrCH TFC.

Since the dedicated CCTrCH TFC selection takes precedence over the EU CCTrCH, and the power requirement may change during the dedicated TTI, the minimum set of TFCs of the EU CCTrCH may still be transmitted in an excess power state even though power was reserved when the dedicated TFC was selected. In this situation, in order to maintain the transmit power within the allowed maximum level, the WTRU scales down all physical channels mapped to the EU CCTrCH, the dedicated CCTrCH, or all physical channels present.

Figure 4:
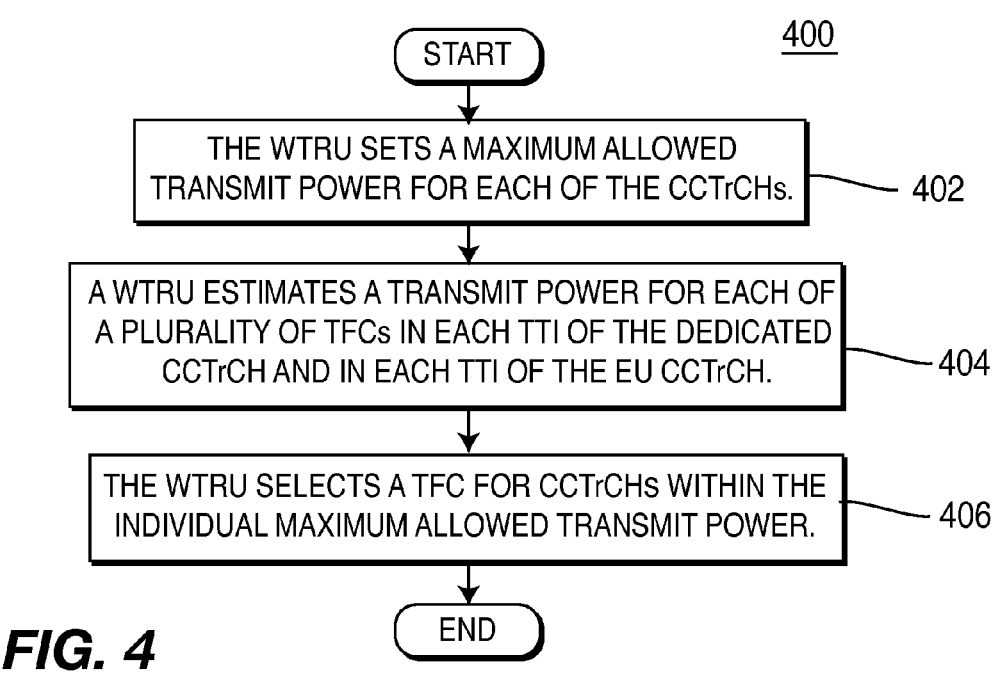
FIG. 4 is a flow diagram of a process for selecting TFCs in accordance with a fourth embodiment of the present invention.

FIG. 4 is a flow diagram of a process 400 for selecting TFCs in accordance with a third embodiment of the present invention. The WTRU sets an individual maximum transmit power, or a ratio relative to the maximum allowed WTRU transmit power, for a dedicated CCTrCH and an EU CCTrCH (step 402). The maximum power level (or the ratio) for each CCTrCH is a configurable parameter. The factors for determining the maximum power level (or the ratio) for each CCTrCH may include, but are not limited to, a data rate of each CCTrCH, quality-of-service (QoS) of each CCTrCH and a relative priority between the CCTrCHs.

In each TTI of the dedicated CCTrCH and in each TTI of the EU CCTrCH, the WTRU estimates the transmit power for each of a plurality of available TFCs (step 404). The WTRU then selects a TFC for each CCTrCH within the individual maximum transmit power of each CCTrCH (step 406). The TFC selection process for each CCTrCH operates independently. The TFC of each CCTrCH is selected from only those TFCs that can be supported by the individual maximum power level determined for a particular CCTrCH.

The dedicated CCTrCH, the EU CCTrCH, or both may be provided with a capability of transmitting a minimum set of TFCs. The minimum set is for reserving a lowest rate for each channel mapped to the CCTrCH, thereby maintaining the basic services for each channel. Since in the EU CCTrCH there is only one TrCH, the minimum set corresponds to a lowest rate per logical channel or MAC-d flow mapped to the EU TrCH. The minimum set of TFCs may be one transport block per TTI for each channel mapped to the CCTrCH or a number of transport blocks per TTI corresponding to a GBR.

The minimum set of TFCs may be transmitted in an excess power state. In this situation, in order to maintain the transmit power within the allowed maximum level, the WTRU scales down all physical channels mapped to the EU CCTrCH, the dedicated CCTrCH, or all physical channels present.

Figure 5:
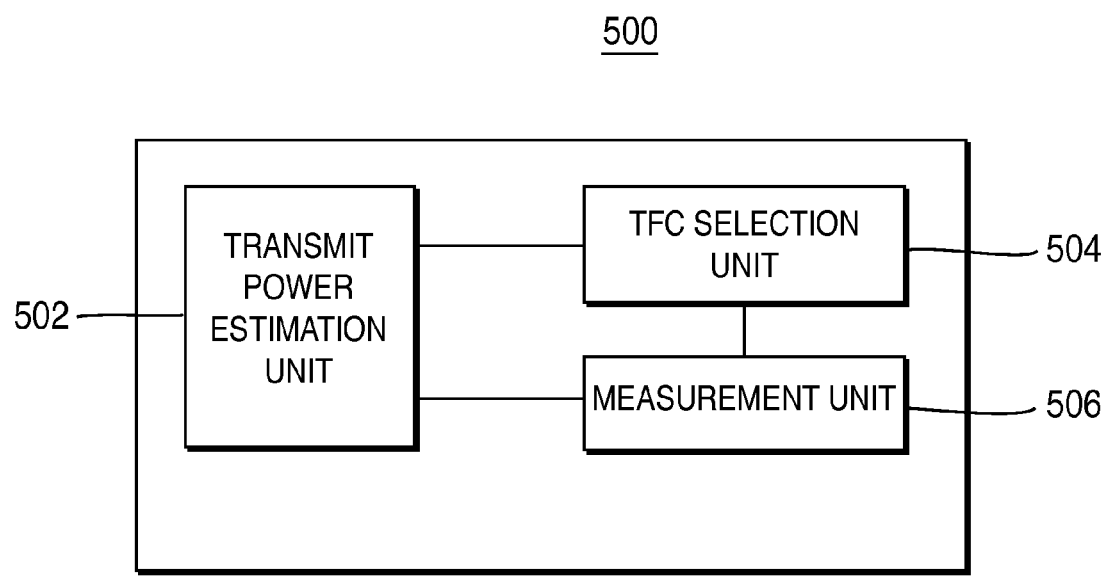
FIG. 5 is a block diagram of an apparatus for selecting TFCs in accordance with the present invention.

FIG. 5 is a block diagram of an apparatus 500 for selecting TFCs in accordance with the present invention. The apparatus 500 comprises a transmit power estimation unit 502, a TFC selection unit 504, and a measurement unit 506. The transmit power estimation unit 502 calculates an estimate of a transmit power for each of a plurality of available TFCs. The TFC selection unit 504 selects a TFC for each CCTrCH such that the sum of the estimated WTRU transmit power for the selected TFCs is within a maximum WTRU transmit power. The measurement unit 506 performs physical measurements of the WTRU transmit power over a predetermined period, and the transmit power estimation unit 502 calculates the estimate of a transmit power of each TFC using the measurement results and a gain factor of the corresponding TFC.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method implemented in a wireless transmit/receive unit (WTRU) for selecting a transport format combination (TFC), the WTRU being configured to process more than one channel for uplink transmission, the method comprising:
    estimating a transmit power for each of a plurality of available TFCs;
    selecting a TFC for an uplink dedicated channel (DCH) and a TFC for an enhanced uplink (EU) channel, wherein the TFC for the DCH is selected first, wherein the TFC for the DCH is selected based on a maximum allowed WTRU transmit power, wherein the TFC selection for the DCH is not affected by a power requirement for a TFC selection for the EU channel, and wherein the TFC for the EU channel is selected based on a WTRU transmit power remaining after the TFC selection for the DCH; and
    transmitting data over the DCH in accordance with the TFC selected for DCH and transmitting data over the EU channel in accordance with the TFC selected for the EU channel, the WTRU to scale down a transmit power for the channels for uplink transmission if the maximum WTRU transmit power is exceeded as a result of selecting the TFC for the EU channel.

2. The method of claim 1 wherein one TFC is selected for each transmit time interval (TTI) of the DCH and one TFC is selected for each TTI of the EU channel.

3. The method of claim 1 wherein the remaining WTRU transmit power is estimated for every transmit time interval of either the EU channel or the DCH.

4. The method of claim 1, wherein the WTRU operates in a excess power state to scale down a transmit power for the channels for uplink transmission if the maximum WTRU transmit power is exceeded as a result of selecting the TFC for the EU channel.

5. The method of claim 1, wherein selecting the TFC for the DCH based on a maximum allowed WTRU transmit power comprises eliminating TFCs with a power requirement higher than the maximum allowed WTRU transmit power from being selected.

6. The method of claim 1, wherein the maximum allowed WTRU transmit power is determined based, at least in part, on at least one of a selected data rate or quality of service.

7. A wireless transmit/receive unit (WTRU) for selecting transport format combinations (TFCs) for a plurality of uplink channels, the WTRU comprising:
    a transmit power estimation unit configured to estimate a transmit power for each of a plurality of available TFCs;
    a TFC selection unit configured to select a TFC for an uplink dedicated channel (DCH) and a TFC for an enhanced uplink (EU) channel, wherein the TFC for the DCH is selected first, wherein the TFC for the DCH is selected based on a maximum allowed WTRU transmit power, wherein the TFC selection for the DCH is not affected by a power requirement for a TFC selection for the EU channel, and wherein the TFC for the EU channel is selected based on a WTRU transmit power remaining after the TFC selection for the DCH; and
    circuitry configured to transmit data over the DCH in accordance with the TFC selected for the DCH and to transmit data over the EU channel in accordance with the TFC selected for the EU channel, and to scale down a transmit power for the plurality of uplink channels if the maximum WTRU transmit power is exceeded as a result of the selection of the TFC for the EU channel.

8. The WTRU of claim 7 wherein one TFC is selected for each transmit time interval (TTI) of the DCH and one TFC is selected for each TTI of the EU channel.

9. The WTRU of claim 7 wherein the remaining WTRU transmit power is estimated for every transmit time interval of either the EU channel or the DCH.

10. The WTRU of claim 7, wherein the circuitry is further configured for the WTRU to operate in a excess power state to scale down a transmit power for the channels for uplink transmission if the maximum WTRU transmit power is exceeded as a result of selecting the TFC for the EU channel.

11. The WTRU of claim 7, wherein the TFC selection unit to select the TFC for the DCH based on a maximum allowed WTRU transmit power comprises the TFC selection unit to eliminate TFCs with a power requirement higher than the maximum allowed WTRU transmit power from being selected.

12. The WTRU of claim 7, wherein the maximum allowed WTRU transmit power is determined based, at least in part, on at least one of a selected data rate or quality of service.

* * * * *